United States Patent Office 3,313,758
Patented Apr. 11, 1967

3,313,758
ACRYLONITRILE POLYMER SPINNING
COMPOSITIONS
Charles H. Apperson, Decatur, Ala., and James R. Misenheimer, Charlotte, N.C., assignors to Monsanto Company, St. Louis, Mo., a corporation of Delaware
No Drawing. Filed Jan. 5, 1966, Ser. No. 531,321
9 Claims. (Cl. 260—29.6)

This application is a continuation-in-part of our copending application, Ser. No. 241,544, filed Dec. 3, 1962, and now abandoned, and entitled, "Acrylonitrile Polymer Spinning Compositions."

This invention relates to the preparation of acrylonitrile polymer spinning compositions. More particularly, this invention relates to the preparation of spinning solutions from acrylonitrile polymers prepared by aqueous medium polymerization.

The polymerization of acrylonitrile is generally carried out in an aqueous medium. The use of water is highly desirable due to its low cost and the fact that the acrylonitrile is somewhat soluble in water, while the polymer formed is insoluble in water. Accordingly, the polymer may be readily filtered from the polymerization medium and washed with water to remove polymerization impurities. A major inconvenience in using an aqueous system has been the necessity for drying the wet polymer prior to the formation of spinning solutions. The drying step is usually an expensive operation, necessitated by the 70–80 percent water content of the emulsion. The water may also be removed by a separate coagulation operation, which is undesirable because it usually introduces impurities into the spinning solution. Often the evaporation procedures result in over heating and discoloration of the polymer. In addition, these operations usually have the accompanying disadvantage of reducing the solubility of the polymer in known solvents.

The solvent power, cost and availability of solvents, such as dimethylformamide, dimethylacetamide, dimethylsulfoxide, and the like, make them particularly attractive for use in the preparation of spinning solutions from acrylonitrile polymers. However, it is known that the solvent power of these solvents is reduced by the presence of water. It is felt that the presence of more than about 10 percent of water in solutions comprising acrylonitrile polymer in a solvent, such as dimethylformamide, tends to cause gelation or coagulation of a portion of the polymer, which in turn, clogs the spinning jets and renders spinning difficult. Therefore, it has heretofore been considered necessary to use only dry solutions, that is essentially water free solutions, in preparing spinnable compositions containing acrylonitrile.

It is an object of this invention to provide more economical spinning solutions from acrylonitrile polymers.

It is another object of this invention to provide spinning solutions of acrylonitrile polymers obtained from an aqueous polymerization without the necessity of a drying step.

Other objects and advantages of this invention will be apparent from the following description.

The objects of this invention are accomplished by washing a wet acrylonitrile polymer cake, obtained by aqueous polymerization, with an organic compound which is a non-solvent for the acrylonitrile polymer until the polymer cake has a water content of less than about 20 percent by weight, then washing the polymer cake with an organic compound which is a solvent for the acrylonitrile polymer until a solution containing less than about 10 percent of water and less than about 15 percent of non-solvent is obtained.

According to this invention, an improved process is provided for preparing spinning compositions from acrylonitrile polymers containing at least 80 percent acrylonitrile and prepared by aqueous medium polymerization which comprises dewatering by filtering, centrifuging, decanting and the like, an aqueous slurry containing said polymer to form a wet polymer cake, mixing the wet polymer filter cake with a non-solvent for the polymer and removing sufficient liquid from the slurry to provide a mixture having a water content of about 2 to 20 percent by weight, mixing this wet filter cake with a solvent for the polymer, and filtering to remove sufficient liquid from this slurry to provide a mixture having a polymer content of from about 27 to about 50 percent by weight, a non-solvent content of from about 0 to about 15 percent by weight, and a water content of 0 to about 10 percent by weight. The resulting mixture may be heated to a temperature greater than 60° C., preferably 60 °C. to 80° C., to form a colorless spinning solution which may be spun by known dry or wet spinning processes. The compositions prepared by the process of this invention may be readily spun into filaments having good physical properties such as those commonly associated with fibers prepared from acrylonitrile polymers.

The temperature at which the washing step is carried out may vary over a wide range. Temperatures as low as about −10° C. and up to about 30° C. may be used depending upon the non-solvent which is used.

In preparing the spinning solutions for the dry- or wet-spinning processes, it is preferred that the solutions used have a polymer content of from 15 to 30 percent by weight. Solutions containing this desirable polymer content are obtained by adding additional solvent to the solution.

Any non-solvent for acrylonitrile polymers can be used for the purposes of this invention. These added non-solvents should be chemically inert towards the polymer and the solvent and preferably should be non-toxic for purposes of safe commercial production of fibers, films, and the like. Illustrative of the non-solvents suitable for the purposes of this invention are ketones such as acetone, methyl ethyl ketone, 4-methylpentanone-2, and the like; ethers such as diethyl ether, 1,2-dimethoxyethane, and the like; cyclic ethers such as tetrahydrofuran, 1,3-dioxane, ethylene glycol monomethyl ether and the like; glycols such as ethyleneglycol, propylene glycol and the like; and low molecular weight polyglycols such as diethylene glycol, triethylene glycol, polyethylene glycols and the like.

Any solvent for acrylonitrile polymers may be used in the practice of this invention. Illustrative of suitable solvents are N,N-dimethylformamide, N,N-dimethylacetamide, dimethylsulfoxide, ethylene carbonate, and the like.

The present invention pertains to the homopolymers and copolymers of acrylonitrile containing at least about 80 percent of combined acrylonitrile and of a molecular weight suitable for the formation of textile fibers. The polymer may be a copolymer of 80 to 98 percent of acrylonitrile and from 2 to 20 percent of another copolymerizable mono-olefinic monomer. Suitable copolymerizable mono-olefinic monomers for the purposes of this invention include acrylic acid, alpha chloroacrylic acid, and methacrylic acid; the acrylates, such as methylmethacrylate, ethylmethacrylate, butylmethacrylate, methoxymethylmethacrylate, beta-chloroethylmethacrylate, and the corresponding esters of acrylic and alpha-chloracrylic acids; vinyl chloride, vinyl fluoride, vinyl bromide, vinylidene chloride, 1-chloro-1-bromoethylene, methacrylonitrile, acrylamide and methacrylamide, alpha-chloroacrylamide, or mono alkyl substitution products thereof; methyl vinyl ketone; vinyl carboxylates, such as vinyl acetate, vinyl chloroacetate, vinyl propionate, and vinyl stearate; N-vinylimides such as N-vinylphthalimide and N-vinylsuccinimide; methylene malonic esters, itaconic acid and itaconic ester; N-vinylcarbazole; vinyl furan; alkyl vinyl esters; vinyl sulfonic acid; ethylene alpha,beta-dicarboxylic acids or their anhydrides or derivatives, such as diethylcitraconate, diethylmesaconate; styrene, vinyl naphthalene; vinyl-substituted tertiary heterocyclic amines such as the vinyl pyridines and alkyl-substituted vinyl pyridines, for example, 2-vinylpyridine, 4-vinylpyridine, 2-methyl-5-vinylpyridine, and the like; 1-vinylimidazole and alkyl-substituted 1-vinylimidazoles such as 2-, 4-, or 5-methyl-1-vinylimidazole, vinylpyrrolidone, vinylpiperidone and other mono-olefinic copolymerizable monomeric materials.

The polymer can be a ternary interpolymer, for example, products obtained by the interpolymerization of acrylonitrile and two or more of any of the monomers, other than acrylonitrile, listed above. More specifically, and preferably, the ternary polymers containing from 80 to 98 percent of acrylonitrile, from 1 to 10 percent of a vinyl pyridine or a 1-vinylimidazole, and from 1 to 18 percent of another copolymerizable mono-olefinic substance, such as methacrylonitrile, vinyl acetate, methyl methacrylate, vinyl chloride, vinylidene choloride, and the like.

The polymer can also be a blend of polyacrylonitrile or a copolymer of from 80 to 98 percent acrylonitrile and from 1 to 20 percent of at least one other mono-olefinic copolymerizable monomeric substance with from 2 to 50 percent of the weight of the blend of a copolymer of from 80 to 90 percent of a vinyl-substituted tertiary heterocyclic amine and from 10 to 70 percent of at least one other mono-olefinic copolymerizable monomer. Preferably, when the polymeric material comprises a blend, it will be a blend of from 80 to 99 percent of a copolymer of 80 to 98 percent acrylonitrile and from 2 to 20 percent of another mono-olefinic monomer, such as vinyl acetate, with from 1 to 20 percent of a copolymer of from 30 to 90 percent of a vinyl-substituted tertiary heterocyclic amine such as vinylpyridine, a 1-vinylimidazole, or a vinyl lactam, and from 10 to 70 percent of acrylonitrile to give a blend having an overall vinyl-substituted tertiary heterocyclic amine content of from 2 to 10 percent based on the weight of the blend.

While the preferred polymers employed in the instant invention are those containing at least 80 percent acrylonitrile, generally recognized as the fiber-forming acrylonitrile polymers, it will be understood that the invention is likewise applicable to polymers containing less than 80 percent of acrylonitrile when such polymers are suitable in forming fibers.

The polymers useful in the practice of the present invention are prepared by an aqueous polymerization procedure. If it is desired to produce shaped articles from the acrylonitrile polymer solutions of the present invention which have a modified appearance or modified properties, various agents may be added to the solutions to accomplish these effects. Such added agents may be pigments, dyes, anti-static agents, fire-retarding agents, and the like.

The following examples further illustrate the process of this invention. The parts and percentages in the examples are by weight unless othewise specified.

EXAMPLE I

A mixture of 1750 grams of deionized water and 750 grams of a copolymer comprising 93 percent acrylonitrile and 7 percent vinyl acetate was filtered under reduced pressure to obtain a wet polymer cake containing approximately 65 percent water and 35 percent polymer. The wet polymer cake was slurried with 3000 grams of acetone, and the slurry was stirred for 15 minutes at room temperature. The mixture was then filtered under reduced pressure yielding a non-solvent-washed wet cake containing approximately 20 percent water, 29 percent acetone, and 51 percent polymer. The non-solvent-washed wet cake was then slurried with 3000 grams of dimethylacetamide which had been cooled to $-15°$ C. The slurry was stirred for 15 minutes and filtered, giving a solvent-washed wet polymer cake containing approximately 4 percent water, 6 percent acetone, 47 percent dimethylacetamide, and 43 percent polymer. A viscous spinning solution was obtained by adding to a solvent-washed wet polymer cake prepared in a similar manner sufficient dimethylacetamide to give a solution containing approximately 25 percent polymer and heating to about 70° C. for a period of 30 minutes. A clear fluid solution suitable for the formation of fibers by wet spinning methods was obtained.

EXAMPLE II

A mixture of 185 grams of deionized water and 100 grams of a copolymer comprising 93 percent acrylonitrile and 7 percent vinyl acetate was stirred with 300 grams of diethyl ether at room temperature for 15 minutes. The mixture was then filtered under reduced pressure. The diethyl ether washing and filtering procedure was repeated two more times. Then 200 grams of dimethylacetamide cooled to approximately 0° C. was mixed with the resultant non-solvent-washed wet cake. After 15 minutes of stirring, the mixture was filtered under reduced pressure. The dimethylacetamide washing and filtering procedure was repeated yielding a solvent-washed wet polymer cake containing approximately 35 percent polymer and 8 percent water, the remainder being a mixture of dimethylacetamide and diethyl ether.

A viscous spinning solution was obtained by adding sufficient dimethylacetamide to the solvent-washed wet polymer cake to give approximately 25 percent polymer. A clear fluid solution suitable for the formation of fibers by wet spinning methods was obtained by heating the mixture to approximately 70° C. whereby a large quantity of the remaining ether was removed by evaporation.

EXAMPLE III

A wet cake as used in Example II was treated similarly with methyl ethyl ketone in three filtration steps to give a polymer cake of approximately 17 percent water. This wet cake was treated with 200 grams of dimethylacetamide at 0° C. and filtered to give a mixture consisting of approximately 35 percent polymer, and 6.5 percent water. This wet cake was suitable for preparing viscous solutions for the formation of fibers by wet spinning methods.

EXAMPLE IV

A wet cake as used in Example II was treated similarly with ethylene glycol in three filtration steps to give a non-solvent-washed wet polymer cake. This cake was mixed with 200 grams of dimethylacetamide at 0° C. and filtered to give a solvent-washed wet polymer cake comprised of approximately 35 perecent polymer and 3.7 percent water. The resultant wet polymer cake is suitable for preparing viscous solutions for the formation of fibers by wet spinning methods.

EXAMPLE V

A wet cake as used in Example II was treated similarly with tertiary butyl alcohol in two filtration steps to give a non-solvent-washed wet polymer cake comprised approximately 64 percent polymer and 2.6 percent water. This cake was washed twice with dimethylacetamide by mixing with 200 gram portions of the solvent cooled to 0° C. and filtering under reduced pressure. This resulted in a solvent-washed mixture which is comprised of approximately 27 percent polymer, 2.2 percent water, 0.2 percent tertiary butyl alcohol and 70 percent dimethylacetamide and which is suitable for preparing viscous solutions for formation of fibers by wet spinning methods.

EXAMPLE VI

A mixture of 185 grams of deionized water and 100 grams of a blend of 88 percent of (A) a copolymer of 91 percent acrylonitrile and 9 percent vinyl acetate and 12 percent of (B) a copolymer of 50 percent acrylonitrile and 50 percent 2 methyl-5-vinylpyridine was prepared. Three hundred grams of ethylene glycol monomethyl ether was added and the mixture was agitated and then filtered under reduced pressure. Two additional 300 gram portions of ethylene glycol monomethyl ether were added and the mixture was agitated and filtered after each addition. The resultant wet cake contained approximately 35 percent polymer and 3.7 percent water. The non-solvent-washed wet polymer cake is suitable for wash- with a cold polymer solvent to give a solvent-washed wet polymer cake suitable for preparing viscous spinning solutions.

EXAMPLE VII

A mixture of 1750 grams of deionized water and 750 grams of a copolymer comprising approximately 93 percent acrylonitrile and 7 percent vinyl acetate was filtered under reduced pressure to give a wet polymer cake. Three thousand five hundred grams of diethylene glycol was added to the wet polymer cake, and the mixture was stirred for 15 minutes at room temperature. The mixture was then filtered under reduced pressure. The diethylene glycol washing and filtering procedure was repeated giving a nonsolvent-washed wet polymer cake containing approximately 39 percent polymer and 3.8 percent water. Three thousand five hundred grams of dimethylacetamide, cooled to −15° C., was then added to this cake, and the mixture was stirred for 15 minutes. The mixture was then filtered under reduced pressure giving a solvent-washed wet polymer cake containing approximately 1.8 percent water, 16 percent diethylene glycol and 42 percent polymer.

The resultant solvent-washed wet polymer cake is suitable for the preparation of viscous solutions for the formation of fibers by wet spinning methods.

As many widely different embodiments of this invention may be made without departing from the spirit and scope thereof, it is to be understood that the invention is not limited to the specific embodiments thereof except as defined in the appended claims.

We claim:
1. A process for preparing compositions which can be readily prepared for spinning from acrylonitrile polymers containing at least 80 percent by weight acrylonitrile and prepared by aqueous medium polymerization, which comprises dewatering the aqueous acrylonitrile polymer slurry to form a wet polymer filter cake, washing said filter cake with an organic non-solvent for said acrylonitrile polymer to provide a mixture having a water content of less than about 20 percent by weight, then washing said mixture with an organic solvent for said acrylonitrile polymer to provide a mixture having a non-solvent content of less than about 15 percent by weight and a water content of less than about 10 percent by weight, said washing being conducted at a temperature of less than about 30° C.

2. A process for preparing compositions which can be readily prepared for spinning from acrylonitrile polymers containing at least 80 percent by weight acrylonitrile and prepared by aqueous medium polymerization, which comprises dewatering the aqueous acrylonitrile polymer slurry to form a wet polymer filter cake, washing said filter cake with an organic non-solvent for said acrylonitrile polymer, removing sufficient liquid from the washed polymer to provide a mixture having a water content of from about 2 to about 20 percent by weight, then washing said mixture with an organic solvent for said acrylonitrile polymer, and removing sufficient liquid from the washed polymer to provide a mixture having a polymer content of from about 27 to about 50 percent by weight, a non-solvent content of from about 0 to about 15 percent by weight, and a water content of from about 0 to about 10 percent by weight, said washing being conducted at a temperature of less than about 30° C.

3. A process as defined in claim 2 wherein the acrylonitrile polymer is a copolymer containing from 80 to 98 percent by weight of acrylonitrile and from 2 to 20 percent of another polymerizable mono-olefinic monomer copolymerized therewith.

4. A process as defined in claim 2 wherein the acrylonitrile polymer is a blend of (A) a copolymer containing 90 to 98 percent of acrylonitrile and 2 to 10 percent of vinyl acetate copolymerized therewith, and a sufficient amount of (B) a copolymer containing 10 to 70 percent of acrylonitrile and 30 to 90 percent of a vinyl-substituted tertiary heterocyclic amine to give a blend having an overall vinyl-substituted tertiary heterocyclic amine content of from 2 to 10 percent.

5. A process as defined in claim 2 wherein the acrylonitrile polymer is polyacrylonitrile.

6. A process for preparing spinning solutions from acrylonitrile polymers containing at least 80 percent by weight acrylonitrile and prepared by aqueous medium polymerization, which comprises dewatering the aqueous acrylonitrile polymer slurry to form a wet polymer filter cake, washing said filter cake with an organic non-solvent for said acrylonitrile polymer, removing sufficient liquid from the washed polymer to provide a mixture having a water content of from about 2 to about 20 percent by weight, then washing said mixture with an organic solvent for said acrylonitrile polymer, removing sufficient liquid from the washed polymer to provide a mixture having a polymer content of from about 27 to about 50 percent by weight, a non-solvent content of from about 0 to about 15 percent by weight, and a water content of from about 0 to about 10 percent by weight, said washing being conducted at a temperature of less than about 30° C., and thereafter, adding a sufficient amount of organic solvent to provide a mixture having a polymer content of from about 15 to about 30 percent by weight, and heating said mixture at a temperature of above about 60° C. to obtain a homogeneous solution.

7. A process as defined in claim 6 wherein the acrylonitrile polymer is a copolymer containing from 80 to 98 percent of acrylonitrile and from 2 to 20 percent of another polymerizable mono-olefinic monomer copolymerized therewith.

8. A process as defined in claim 6 wherein the acrylonitrile polymer is a blend of (A) a copolymer containing 90 to 98 percent of acrylonitrile and 2 to 10 percent of vinyl acetate copolymerized therewith, and a sufficient amount of (B) a copolymer containing 10 to 70 percent of acrylonitrile and 30 to 90 percent of a vinyl-substituted tertiary heterocyclic amine to give a blend having an overall vinyl-substituted tertiary heterocyclic amine content of from 2 to 10 percent.

9. A process as defined in claim 6 wherein the acrylonitrile polymer is polyacrylonitrile.

References Cited by the Examiner
UNITED STATES PATENTS 2,496,267   2/1950   Chaney _____ 260—29.6
2,637,717   5/1953   Basdekis _____ 260—29.6

MURRAY TILLMAN, *Primary Examiner.*

W. J. BRIGGS, *Assistant Examiner.*